(12) United States Patent
Arulandu et al.

(10) Patent No.: US 9,913,331 B2
(45) Date of Patent: Mar. 6, 2018

(54) LED LIGHTING CIRCUIT FED BY CURRENT SOURCE

(71) Applicant: PHILIPS LIGHTING HOLDING B.V., Eindhoven (NL)

(72) Inventors: Kumar Arulandu, Eindhoven (NL); Rifat Ata Mustafa Hikmet, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/314,928

(22) PCT Filed: May 26, 2015

(86) PCT No.: PCT/EP2015/061527
§ 371 (c)(1),
(2) Date: Nov. 29, 2016

(87) PCT Pub. No.: WO2015/181132
PCT Pub. Date: Dec. 3, 2015

(65) Prior Publication Data
US 2017/0245332 A1 Aug. 24, 2017

(30) Foreign Application Priority Data

May 30, 2014 (EP) .................................. 14170538

(51) Int. Cl.
*H05B 33/08* (2006.01)
(52) U.S. Cl.
CPC ....... *H05B 33/0815* (2013.01); *H05B 33/083* (2013.01); *H05B 33/0845* (2013.01); *H05B 33/0857* (2013.01); *Y02B 20/347* (2013.01)

(58) Field of Classification Search
CPC .............. H05B 33/083; H05B 33/0818; H05B 33/0803; H05B 33/0809; H05B 33/0827; H05B 33/0815
(Continued)

(56) References Cited

U.S. PATENT DOCUMENTS 8,368,315 B2    2/2013   Gaines et al.
8,400,071 B2    3/2013   Gaines et al.
(Continued)

FOREIGN PATENT DOCUMENTS

JP    2010092676 A    4/2010
JP    2012243755 A    12/2012
(Continued)

*Primary Examiner* — Douglas W Owens
*Assistant Examiner* — Wei Chan
(74) *Attorney, Agent, or Firm* — Akarsh P. Belagodu

(57) ABSTRACT

A lighting circuit comprises a first circuit (1) with an element (31) with a diode function coupled serially to a parallel combination of a capacitor (41) and a serial combination of a first LED (21) and a first switch (11) and comprises a second circuit (2) with a second switch (12). The circuits (1, 2) are parallel circuits. The lighting circuit produces light in response to a supply current from a current source (6). The second switch (12), when conducting, lets the supply current pass and prevents it from flowing through the element (31), and, when non-conducting, blocks the supply current and it flows through the element (31). The first switch (11), when non-conducting, prevents the first LED (21) from producing some of the light, and, when conducting, allows the first LED (21) to produce some of the light. Power for the first LED (21) is delivered via the supply current when flowing through the element (31) or via a capacitor current supplied by the capacitor (41).

14 Claims, 8 Drawing Sheets

(58) Field of Classification Search
USPC ... 315/188, 294, 291, 185 R, 186, 293, 312, 315/320
See application file for complete search history.

(56) References Cited

U.S. PATENT DOCUMENTS

| | | | |
|---|---|---|---|
| 2010/0194274 A1* | 8/2010 | Hoogzaad | H05B 33/0803 315/51 |
| 2010/0308739 A1 | 12/2010 | Shteynberg et al. | |
| 2011/0109247 A1* | 5/2011 | Hoogzaad | H05B 33/0818 315/294 |
| 2012/0274228 A1 | 11/2012 | Szczeszynski | |
| 2014/0085731 A1 | 3/2014 | Farris et al. | |
| 2015/0108909 A1* | 4/2015 | Rupp | H05B 33/083 315/188 |

FOREIGN PATENT DOCUMENTS

| WO | WO2007069200 A1 | 6/2007 |
|---|---|---|
| WO | 2013021320 A1 | 2/2013 |

\* cited by examiner

A

B

C

D

E

LED LIGHTING CIRCUIT FED BY CURRENT SOURCE

CROSS-REFERENCE TO PRIOR APPLICATIONS

This application is the U.S. National Phase application under 35 U.S.C. § 371 of International Application No. PCT/EP2015/061527, filed on May 26, 2015, which claims the benefit of European Patent Application No. 14170538.4, filed on May 30, 2014. These applications are hereby incorporated by reference herein.

FIELD OF THE INVENTION

The invention relates to a lighting circuit for producing light. The invention further relates to a device comprising the lighting circuit and further comprising a current source for producing a supply current. Examples of such a device are lamps.

BACKGROUND OF THE INVENTION

WO 2007/069200 A1 discloses in its FIG. 4 a lighting circuit fed via a voltage source and first and second current sources. The lighting circuit comprises blue and green LEDs and red and amber LEDs. Owing to the fact that the blue and green LEDs require a larger current amplitude than the red and amber LEDs, the red LED is coupled serially to the first current source and the amber LED is coupled serially to the second current source and both combinations are coupled in parallel to each other, and the parallel combination is coupled serially to a serial combination of the blue and green LEDS. This way, the red and amber LEDs each draw 350 mA, and the blue and green LEDs each draw 700 mA. Each one of the LEDs is coupled in parallel to a switch for control purposes. The entire combination is coupled to the voltage source.

US 2012/274228 A1 discloses a circuit for driving a LED load and comprises a controllable converter and a control circuit. The control circuit is responsive to a PWM signal, the signal having two levels to turn off respectively turn on the converter. A load disconnect switch is coupled in series with the LED load and is responsive to the PWM signal. The load disconnect switch opens the load current path when the converter turns off, thereby terminating the load current flow.

SUMMARY OF THE INVENTION

It is an object of the invention to provide an improved lighting circuit. It is a further object of the invention to provide a device.

According to a first aspect, a lighting circuit is provided for producing light, the lighting circuit comprising:

a first circuit comprising an element with a diode function, a capacitor, a first light emitting diode arrangement and a first switch, the element with the diode function being coupled serially to parallel branches, a first branch of the parallel branches comprising the capacitor, and a second branch of the parallel branches comprising the first light emitting diode arrangement and the first switch coupled serially to each other, and a second circuit comprising a second switch, the second switch being coupled in parallel to the first circuit; and wherein the lighting circuit further comprises a fourth circuit, wherein the fourth circuit comprises a second light emitting diode arrangement and a third switch, wherein the second light emitting diode arrangement and the third switch are coupled in parallel, and wherein the second and the fourth circuit are coupled in series.

The lighting circuit comprises a parallel combination of first and second circuits. The first circuit comprises a serial combination of a first light emitting diode arrangement and a first switch in a first branch and comprises a capacitor in a second branch. The first and second branches are parallel branches. A combination of the parallel branches is coupled serially to an element with a diode function in the first circuit. The second circuit comprises a second switch. This way, a lighting circuit has been created with three possible current paths: A first current path is formed by the element with the diode function, the first light emitting diode arrangement and the first switch, a second current path is formed by the element with the diode function and the capacitor, and a third current path is formed by the second switch. By bringing the first switch in conducting and non-conducting modes at a first duty cycle and by bringing the second switch in conducting and non-conducting modes at a second duty cycle, this lighting circuit can be fed via one and the same current source that produces a supply current having an amplitude that is not specifically optimized for the particular first light emitting diode arrangement. According to the invention, the second and fourth circuits are coupled serially to each other. This lighting circuit can be fed via one and the same current source that produces a supply current having a current amplitude that is specifically optimized for the second light emitting diode arrangement. The fact that the current amplitude in this case is not specifically optimized for the first light emitting diode arrangement, for example owing to the fact that the first light emitting diode arrangement is emitting light at a different efficiency than the second light emitting diode arrangement, can be compensated through the first and second switches and their duty cycles. This is a great improvement.

A light emitting diode arrangement comprises one or more light emitting diodes of whatever kind and in whatever combination.

An embodiment of the lighting circuit is defined by the lighting circuit producing the light in response to a supply current from a current source, the second switch being configured to, in a conducting mode of the second switch, letting the supply current pass, thereby preventing the supply current from flowing through the element with the diode function, and the second switch being configured to, in a non-conducting mode of the second switch, letting the supply current not pass, whereby the supply current is forced to flow through the element with the diode function. In a non-conducting mode of the second switch, a supply current originating from a current source is used for charging the capacitor and/or for feeding the first light emitting diode arrangement via a conducting first switch. In a conducting mode of the second switch, this supply current cannot reach the capacitor and the first light emitting diode arrangement.

An embodiment of the lighting circuit is defined by the first switch being configured to, in a non-conducting mode of the first switch, preventing the first light emitting diode arrangement from producing at least a first part of the light, and the first switch being configured to, in a conducting mode of the first switch, allowing the first light emitting diode arrangement to produce at least the first part of the light, power for the first light emitting diode arrangement being delivered via the supply current when flowing through the element with the diode function or being delivered via a capacitor current supplied by the capacitor. In a non-conducting mode of the first switch, the first light emitting diode arrangement cannot receive any power and cannot produce at least a first part of the light. In a conducting mode of the first switch, the first light emitting diode arrangement can receive power and can produce at least a first part of the light, whereby the power is delivered via the supply current originating from the current source when flowing through the element with the diode function or whereby the power is delivered via a capacitor current supplied by the capacitor. The element with the diode function prevents that this capacitor current can flow through the conducting second switch.

An embodiment of the lighting circuit is defined by further comprising:

a third circuit for generating a first control signal for controlling the first switch and for generating a second control signal for controlling the second switch, the first control signal having respective first and second values for bringing the first switch into the respective conducting and non-conducting modes, and the second control signal having respective third and fourth values for bringing the second switch into the respective conducting and non-conducting modes.

The third circuit generates first and second control signals for controlling the first and second switches. Usually, the first and second switches may be controlled digitally via binary control signals.

An embodiment of the lighting circuit is defined by the lighting circuit producing the light in response to a supply current from a current source, the third switch being configured to, in a conducting mode of the third switch, letting the supply current pass, thereby preventing the supply current from flowing through the second light emitting diode arrangement, and the third switch being configured to, in a non-conducting mode of the third switch, letting the supply current not pass, whereby the supply current is forced to flow through the second light emitting diode arrangement for producing at least a second part of the light. The parallel combination of the second light emitting diode arrangement and the third switch functions identically to the ones disclosed in WO 2007/069200 A1.

An embodiment of the lighting circuit is defined by:

the third circuit being configured to generate a third control signal for controlling the third switch, the third control signal having respective fifth and sixth values for bringing the third switch into the respective conducting and non-conducting modes.

The third circuit generates the third control signal for controlling the third switch. Usually, the third switch may be controlled digitally via a binary control signal.

An embodiment of the lighting circuit is defined by further comprising:

a fifth circuit comprising a third light emitting diode arrangement and a fourth switch in a parallel combination, the fourth and fifth circuits being coupled serially to each other.

The fifth circuit comprises a third light emitting diode arrangement and a fourth switch coupled in parallel to each other. The second, fourth and fifth circuits are coupled serially to each other. This lighting circuit can be fed via one and the same current source that produces a supply current having a current amplitude that is specifically optimized for the second and third light emitting diode arrangements. The fact that the current amplitude in this case is not specifically optimized for the first light emitting diode arrangement, for example owing to the fact that the first light emitting diode arrangement is emitting light at a different efficiency than the second and third light emitting diode arrangements, can be compensated through the first and second switches and their duty cycles.

An embodiment of the lighting circuit is defined by the lighting circuit producing the light in response to a supply current from a current source, the fourth switch being configured to, in a conducting mode of the fourth switch, letting the supply current pass, thereby preventing the supply current from flowing through the third light emitting diode arrangement, and the fourth switch being configured to, in a non-conducting mode of the fourth switch, letting the supply current not pass, whereby the supply current is forced to flow through the third light emitting diode arrangement for producing at least a third part of the light. The parallel combination of the third light emitting diode arrangement and the fourth switch functions identically to the ones disclosed in WO 2007/069200 A1.

An embodiment of the lighting circuit is defined by:

the third circuit being configured to generate a fourth control signal for controlling the fourth switch, the fourth control signal having respective seventh and eighth values for bringing the fourth switch into the respective conducting and non-conducting modes.

The third circuit generates the fourth control signal for controlling the fourth switch. Usually, the fourth switch may be controlled digitally via a binary control signal.

An embodiment of the lighting circuit is defined by the first switch comprising a first transistor, the second switch comprising a second transistor, and the element with the diode function comprising a diode or a zener diode or a part of a third transistor or a fourth transistor.

An embodiment of the lighting circuit is defined by the third switch comprising a fifth transistor.

An embodiment of the lighting circuit is defined by the fourth switch comprising a sixth transistor.

An embodiment of the lighting circuit is defined by a value of a first duty cycle of the first switch defining an amplitude of an arrangement current flowing through the first light emitting diode arrangement for a given value of a second duty cycle of the second switch, and a value of the second duty cycle of the second switch defining an average value of the arrangement current. Usually, a value of a conducting time of the second switch will define an average value (over a time-interval equal to a sum of the conducting time and a subsequent non-conducting time of the second switch) of an arrangement current flowing through the first light emitting diode arrangement in an inverse way (for example a negative linear way like $y=-a \cdot x+b$ with a and b being positive). In other words, in case the second duty cycle of the second switch is increased, the (real) average value of the arrangement current flowing through the first light emitting diode arrangement will be decreased (example: for a second duty cycle of 10% (40%, 70%), an average value of the arrangement current will be 90% (60%, 30%) of an average value of the supply current). Usually, a value of a conducting time of the first switch will define an amplitude of the arrangement current flowing through the first light emitting diode arrangement in an inverse way (for example an inverse linear way like $y=c/x$ with c being positive). In other words, in case the first duty cycle of the first switch is decreased, the (instantaneous) value of the amplitude of the arrangement current flowing through the first light emitting diode arrangement will be increased for a given and fixed value of the second duty cycle of the second switch (example: for a first duty cycle of 100% (50%, 25%), an amplitude of the arrangement current will be 100% (200%, 400%) of the average value defined by the second duty cycle). A product of the duration of the conducting time of the first switch and the amplitude of the arrangement current flowing through the first light emitting diode arrangement will substantially be constant for a given and fixed value of the duration of the conducting time of the second switch.

According to a second aspect, a device is provided comprising the lighting circuit and further comprising a current source for producing a supply current.

Different light emitting diode arrangements that produce light at different efficiencies in one lighting circuit require in a prior art situation different feeding currents having different amplitudes. A basic idea is that at least one section of a lighting circuit should comprise a first circuit with an element with a diode function coupled serially to a parallel combination of a capacitor and a serial combination of a first light emitting diode arrangement and a first switch and should comprise a second circuit with a second switch coupled in parallel to the first circuit, where other sections of the lighting circuit may then comprise parallel combinations of light emitting diode arrangements and switches only.

A problem to provide an improved lighting circuit has been solved. A further advantage is that a current source for feeding the lighting circuit is to be preferred over a voltage source owing to the fact that a behavior of a light emitting diode arrangement is defined by a current flowing through this arrangement.

These and other aspects of the invention will be apparent from and elucidated with reference to the embodiments described hereinafter.

DETAILED DESCRIPTION OF EMBODIMENTS

Figure 1:
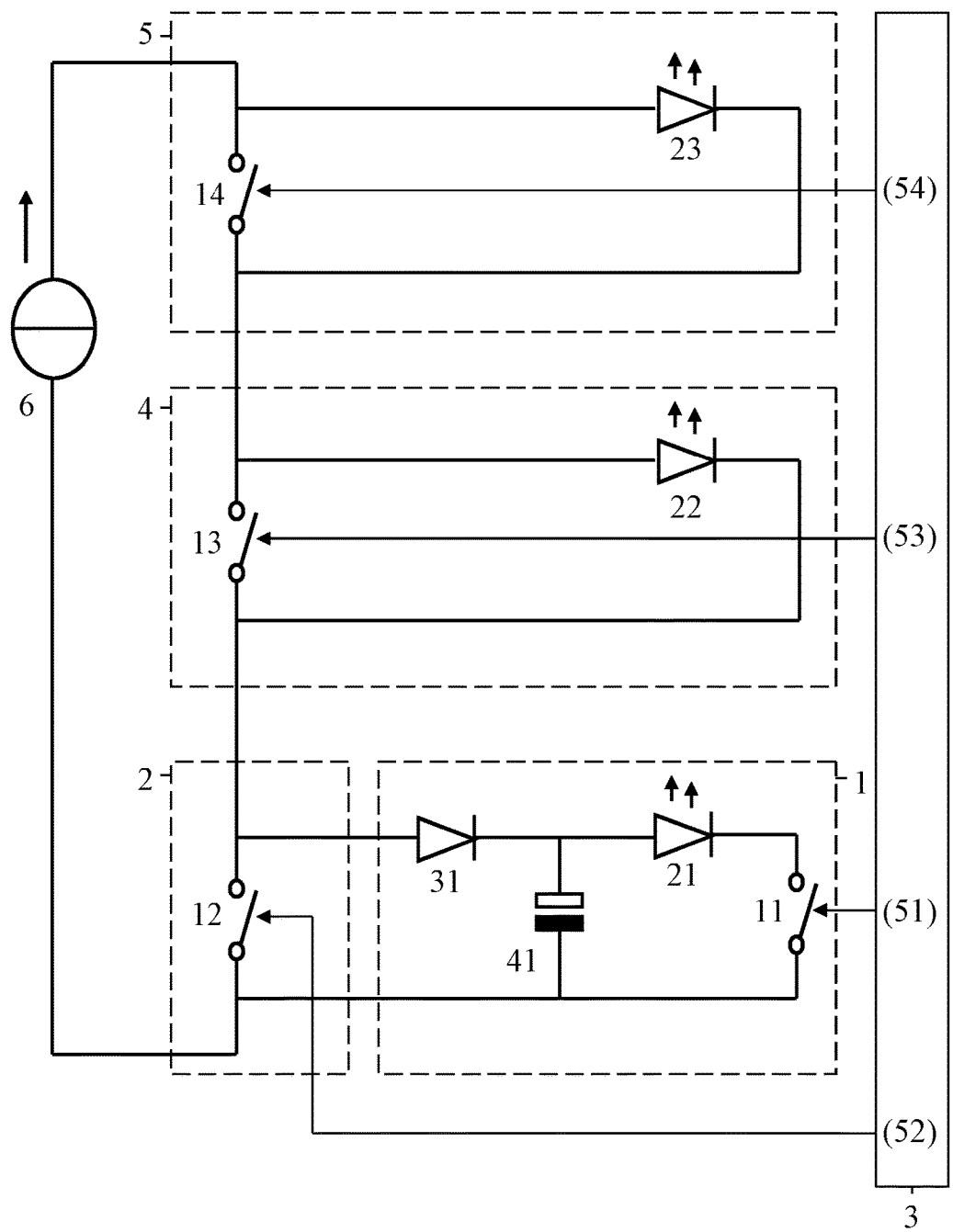
FIG. 1 shows a lighting circuit.

In the FIG. 1, a lighting circuit is shown. The lighting circuit produces light and comprises a first circuit 1 with an element 31 with a diode function, a capacitor 41, a first light emitting diode arrangement 21 and a first switch 11. The element 31 with the diode function, such as for example a diode, a zener diode or (a part of) a transistor, is coupled serially to first and second parallel branches. The first branch comprises the capacitor 41, such as for example one or more capacities of whatever kind and in whatever combination. The second branch comprises a serial coupling of the first light emitting diode arrangement 21, such as for example one or more light emitting diodes of whatever kind and in whatever combination, and the first switch 11, such as for example a transistor, such as for example a MOSFET. The lighting circuit further comprises a second circuit 2 with a second switch 12, such as for example another transistor, such as for example another MOSFET. The first and second circuits 1 and 2 are coupled in parallel to each other.

The lighting circuit may further comprise a third circuit 3 for generating a first control signal 51 for controlling the first switch 11 and for generating a second control signal 52 for controlling the second switch 12. The first control signal 51 has one out of two values for bringing the first switch 11 into conducting and non-conducting modes, and the second control signal 52 has one out of two values for bringing the second switch 12 into conducting and non-conducting modes.

The lighting circuit may further comprise a fourth circuit 4 with a second light emitting diode arrangement 22, such as for example one or more light emitting diodes of whatever kind and in whatever combination, and a third switch 13, such as for example a transistor, such as for example a MOSFET, in a parallel combination. The second and fourth circuits 2 and 4 are coupled serially to each other.

The third circuit 3 may be configured for generating a third control signal 53 for controlling the third switch 13. The third control signal 53 has one out of two values for bringing the third switch 13 into conducting and non-conducting modes.

The lighting circuit may further comprise a fifth circuit 5 comprising a third light emitting diode arrangement 23, such as for example one or more light emitting diodes of whatever kind and in whatever combination, and a fourth switch 14, such as for example a transistor, such as for example a MOSFET, in a parallel combination. The fourth and fifth circuits 4 and 5 are coupled serially to each other.

The third circuit 3 may be configured for generating a fourth control signal 54 for controlling the fourth switch 14. The fourth control signal 54 has one out of two values for bringing the fourth switch 14 into conducting and non-conducting modes.

A serial combination of the second, fourth and fifth circuits 2, 4 and 5 is coupled to a current source 6 for producing a supply current. In response to this supply current, the lighting circuit functions as follows.

Via the first control signal 51, a first duty cycle of the first switch 11 is selected. During this first duty cycle, the first switch 11 is a part of the time in a conducting mode and another part of the time in a non-conducting mode. Via the second control signal 52, a second duty cycle of the second switch 12 is selected. During this second duty cycle, the second switch 12 is a part of the time in a conducting mode and another part of the time in a non-conducting mode. The first and second duty cycles may be related to each other, for example owing to the fact that one of them is derived from the other one of them, and the first and second duty cycles may be independent from each other, for example owing to the fact that one of them has got a fixed value or both of them have got fixed values. Each duty cycle not having a fixed value may for example depend on a measurement result.

The second switch 12 is configured to, in a conducting mode, let the supply current from the current source 6 pass, thereby preventing the supply current from flowing through the element 31 with the diode function. The second switch 12 is configured to, in a non-conducting mode, block the supply current, whereby the supply current is forced to flow through the element 31 with the diode function. When being forced to flow through the element 31 with the diode function, the supply current may thereafter either flow to and through the capacitor 41 for charging this capacitor 41 or may flow to and through the serial combination of the first light emitting diode arrangement 21 and the first switch 11 (in case this first switch 11 is in a conducting mode) for feeding the first light emitting diode arrangement 21 or may flow partly to the capacitor 41 and partly to the serial combination of the first light emitting diode arrangement 21 and the first switch 11 (in case this first switch 11 is in a conducting mode).

The first switch 11 is configured to, in a non-conducting mode, prevent the first light emitting diode arrangement 21 from producing at least a first part of the light. The first switch 11 is configured to, in a conducting mode, allow the first light emitting diode arrangement 21 to produce at least the first part of the light. Power for the first light emitting diode arrangement 21 may be delivered via the supply current from the current source 6 when flowing through the element 31 with the diode function or may be delivered via a capacitor current supplied by the capacitor 41 when being sufficiently charged.

Starting from a non-charged capacitor 41, as long as the second switch 12 is in a conducting mode, the capacitor 41 is not charged, and the first light emitting diode arrangement 21 cannot emit light. As soon as the second switch 12 has gone into a non-conducting mode, the capacitor 41 is charged and a voltage present across the capacitor 41 will rise. Until this voltage has reached a minimum threshold value necessary for the serial combination of the first light emitting diode arrangement 21 and the first switch 11 to function, it does not matter whether the first switch 11 is in a conducting or a non-conducting mode. As soon as this voltage has reached the minimum threshold value, the first light emitting diode arrangement 21 can start emitting light in case the first switch 11 is brought into a conducting mode. In this case the first light emitting diode arrangement 21 is directly fed by the current source 6, until the second switch 12 goes into a conducting mode. From that moment on, the first light emitting diode arrangement 21 can continue to emit light by keeping the first switch 11 in a conducting mode, in which case the first light emitting diode arrangement 21 is directly fed by the capacitor 41, as long as this capacitor 41 is sufficiently charged.

The functioning of the fourth and fifth circuits 4 and 5 is identical to the functioning of similar circuits disclosed in WO 2007/069200 A1.

Figure 2:
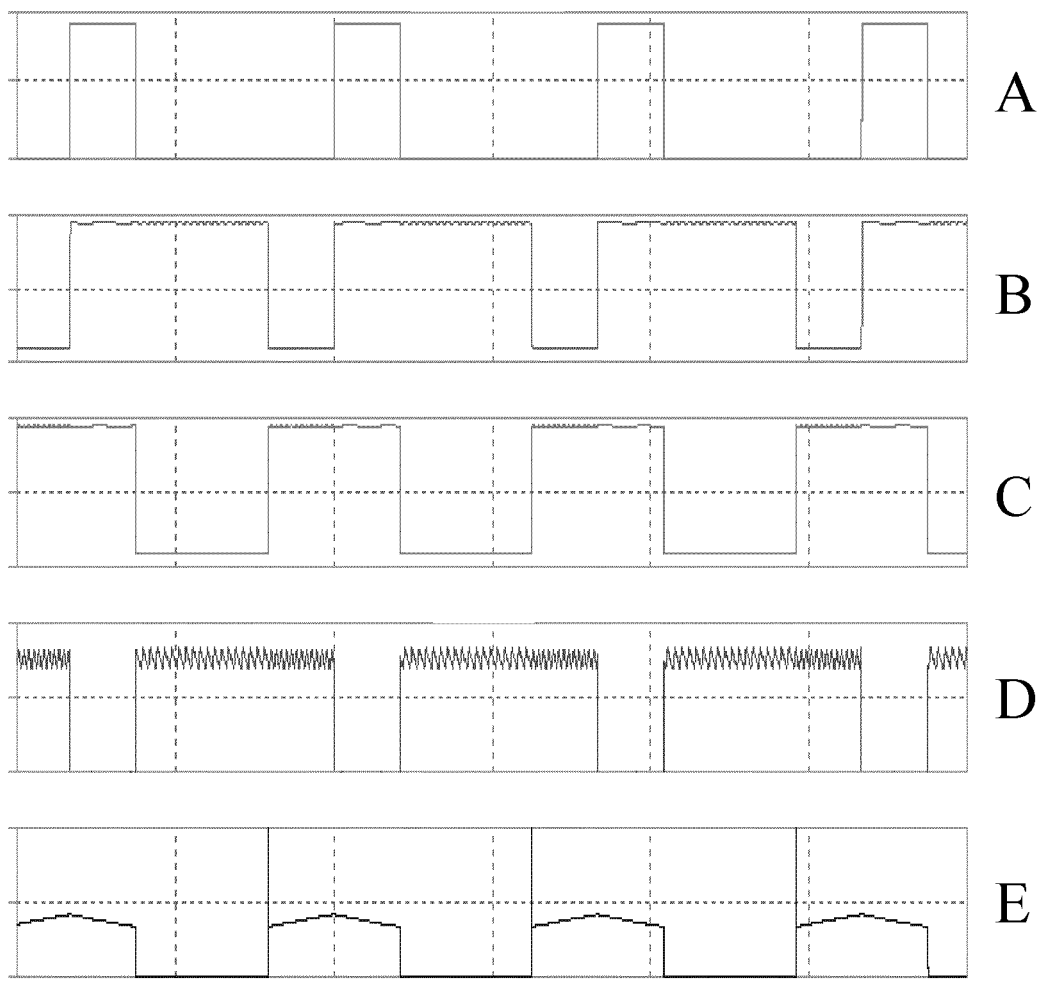
FIG. 2 shows first waveforms.

In the FIG. 2, first waveforms are shown, as a function of time, for a case wherein the fifth circuit 5 is considered not to be present (or short-circuited). The waveform A represents the third control signal 53 for controlling the third switch 13. The waveform B represents the second control signal 52 for controlling the second switch 12. The waveform C represents the first control signal 51 for controlling the first switch 11.

The waveform D represents a current flowing through the second light emitting diode arrangement 22. Clearly, owing to the fact that the third switch 13 and the second light emitting diode arrangement 22 are parts of a parallel combination, the current only flows through the second light emitting diode arrangement 22 in case the third switch 13 is in a non-conducting mode, in other words in case the third control signal 53 (the waveform A) has a low value. In case the third control signal 53 has a high value, the third switch 13 is in a conducting mode, and no current will then flow through the second light emitting diode arrangement 22. A high-frequency ripple present on the current results from the fact that in this case a current source 6 in the form of a switched mode power supply has been used that produces a supply current with an average value of 450 mA whereby a high-frequency ripple is present between 400 mA (450 mA−50 mA) and 500 mA (450 mA+50 mA).

The waveform E represents an arrangement current flowing through the first light emitting diode arrangement 21. Clearly, the arrangement current only flows through the first light emitting diode arrangement 21 in case the first switch 11 is in a conducting mode, in other words in case the first control signal 51 (the waveform C) has a high value. The capacitor 41 is here responsible for the filtering of the high-frequency ripple and for the shape of this waveform E: The capacitor 41 is charged as long as the second switch 12 is in a non-conducting mode, in other words as long as the second control signal 52 (the waveform B) has a low value. During this time, the first light emitting diode arrangement 21 is fed by the current source 6. Thereafter, the capacitor 41 is discharged as soon as the second switch 12 has gone into a conducting mode, in other words as soon as the second control signal 52 has got a high value, in other words during a further time when the second control signal 52 has a high value. During this further time, the first light emitting diode arrangement 21 is fed by the capacitor 41.

The fact that a frequency of the high-frequency ripple on the current flowing through the second light emitting diode arrangement 22 is not constant comes from the fact that during a first part of the time the current source 6 is only feeding the second light emitting diode arrangement 22 where during a second part of the time the current source 6 is feeding both the first and second light emitting diode arrangements 21 and 22. The feeding of only one or both of the first and second light emitting diode arrangements 21 and 22 will result in different voltages being present across the entire serial combination of the second and fourth circuits 2 and 4.

Figure 3:
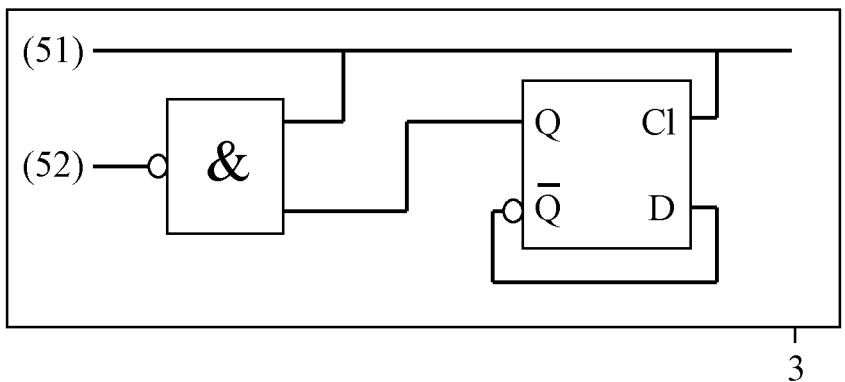
FIG. 3 shows a first embodiment of a third circuit.

In the FIG. 3, a first embodiment of a third circuit 3 is shown. This third circuit 3 comprises a D-Flip-Flop with a clock input receiving the first control signal 51 from a generator not shown and with a D input for receiving an inverted output signal from the D-Flip-Flop. An inverting AND-Gate receives the first control signal 51 and an output signal from the D-Flip-Flop and produces the second control signal 52. So, here the second control signal 52 is derived from the first control signal 51.

Figure 4:
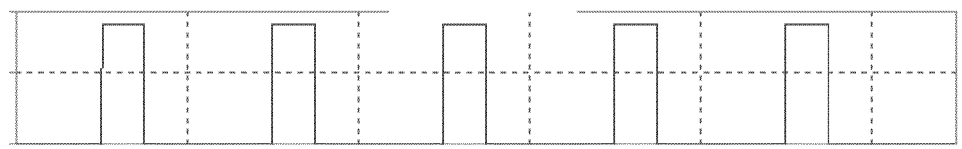
FIG. 4 shows second waveforms.
Figure 4:
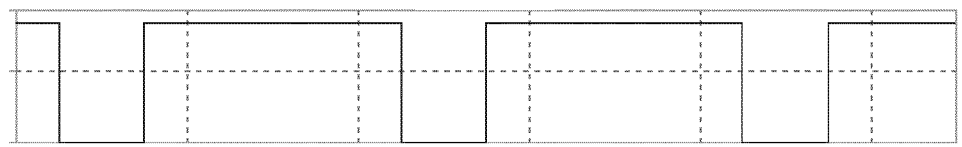
Figure 4:
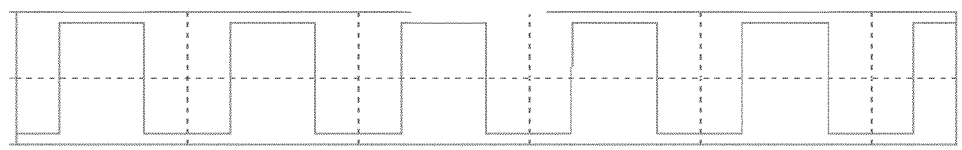
Figure 4:
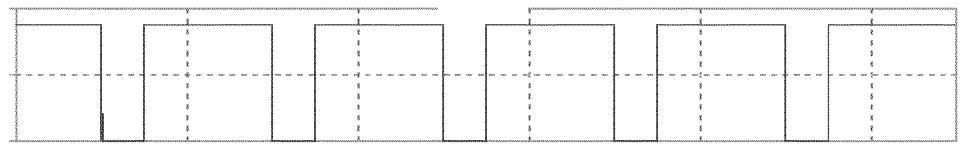
Figure 4:
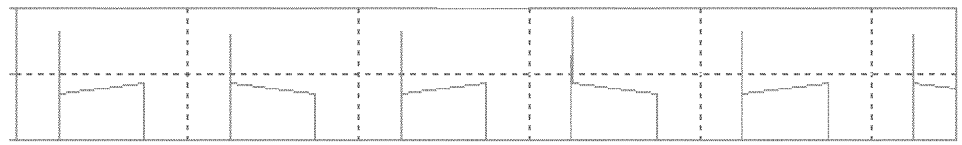

In the FIG. 4, second waveforms are shown, as a function of time, for a case wherein the fifth circuit 5 is considered not to be present, and for a case wherein a third circuit 3 as shown in the FIG. 3 is used. The waveform A represents the third control signal 53 for controlling the third switch 13. The waveform B represents the second control signal 52 for controlling the second switch 12. The waveform C represents the first control signal 51 for controlling the first switch 11.

The waveform D represents a current flowing through the second light emitting diode arrangement 22. Clearly, owing to the fact that the third switch 13 and the second light emitting diode arrangement 22 are parts of a parallel combination, the current only flows through the second light emitting diode arrangement 22 in case the third switch 13 is in a non-conducting mode, in other words in case the third control signal 53 (the waveform A) has a low value. In case the third control signal 53 has a high value, the third switch 13 is in a conducting mode, and no current will then flow through the second light emitting diode arrangement 22. In this case there is no high-frequency ripple present on the current either owing to the fact that a current source has been used that produces a clean supply current or owing to the fact that a ripple present on this supply current has been filtered before having reached the lighting circuit.

The waveform E represents an arrangement current flowing through the first light emitting diode arrangement 21. Clearly, the arrangement current only flows through the first light emitting diode arrangement 21 in case the first switch 11 is in a conducting mode, in other words in case the first control signal 51 (the waveform C) has a high value. The capacitor 41 is responsible for the shape of this waveform E: The capacitor 41 is charged as long as the second switch 12 is in a non-conducting mode, in other words as long as the second control signal 52 (the waveform B) has a low value. During this time, the first light emitting diode arrangement 21 is fed by the current source 6. Thereafter, the capacitor 41 is discharged during a conducting mode of the second switch 12, in other words during a further time when the second control signal 52 has a high value. During this further time, the first light emitting diode arrangement 21 is fed by the capacitor 41.

Figure 5:
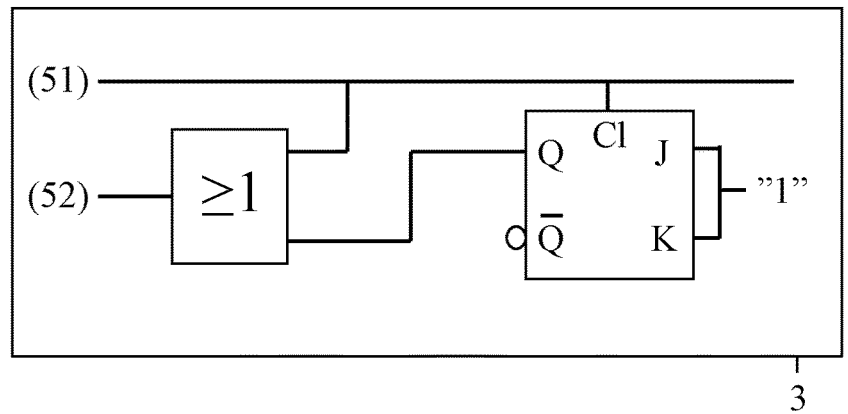
FIG. 5 shows a second embodiment of a third circuit.

In the FIG. 5, a second embodiment of a third circuit 3 is shown. This third circuit 3 comprises a JK-Flip-Flop with both the J input and the K input receiving a signal with a high value and with a clock input receiving the first control signal 51 from a generator not shown. An OR-Gate receives the first control signal 51 and an output signal from the JK-Flip-Flop and produces the second control signal 52. So, here the second control signal 52 is derived from the first control signal 51.

Figure 6:
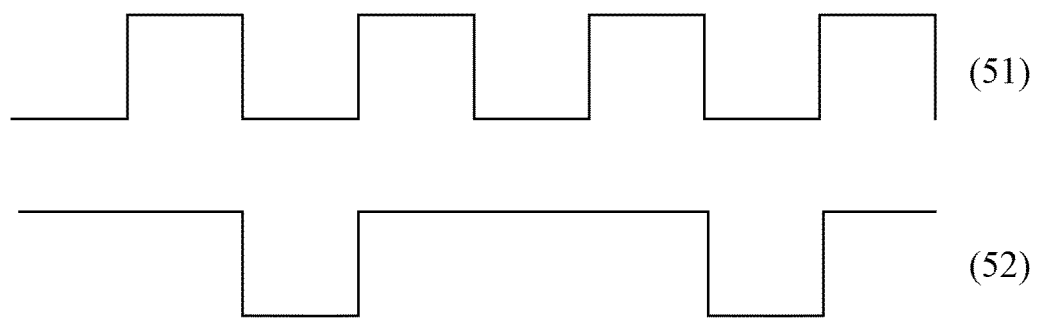
FIG. 6 shows first and second control signals.

In the FIG. 6, first and second control signals 51 and 52 are shown, as a function of time, for a case wherein a third circuit 3 as shown in the FIG. 5 is used.

Figure 7:
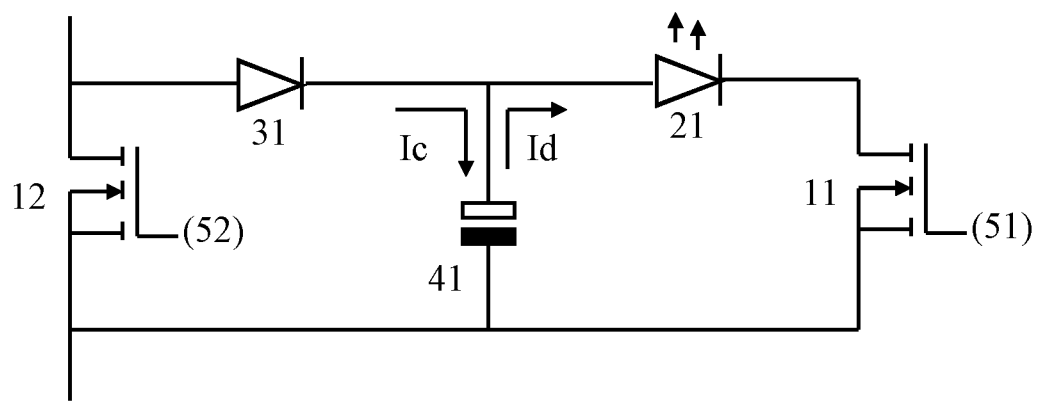
FIG. 7 shows first and second circuits.

In the FIG. 7, first and second circuits 1 and 2 are shown, for a case wherein the first and second switches 11 and 12 are realized through transistors. A charging current Ic flows through the element 31 with a diode function and through the capacitor 41, and a discharging current Id is delivered by the capacitor 41 and corresponds with the capacitor current discussed before and flows through the serial combination of the first light emitting diode arrangement 21 and the first switch 11 when being in a conducting mode.

Figure 8:
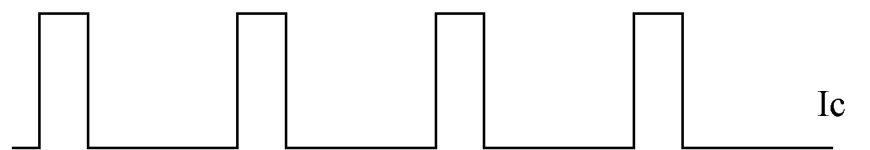
FIG. 8 shows currents.
Figure 8:

In the FIG. 8, currents are shown, as a function of time, a charging current Ic and a discharging current Id as indicated in the FIG. 7. Clearly, in this case, during a first quarter of a second duty cycle of the second switch 12, the charging current Ic is present for charging the capacitor 41, and during second and third quarters of the second duty cycle of the second switch 12, the discharging current Id is present for de-charging the capacitor 41 and for feeding the first light emitting diode arrangement 21. If the (negligible) losses in the capacitor 41 are ignored, an average value of the current flowing through the capacitor 41 will usually be equal to zero, and as a result an amount of energy entering the capacitor 41 will usually be identical to an amount of energy leaving the capacitor 41, so an amplitude of the charging current Ic will be twice as large as an amplitude of the discharging current Id, with a duration of the discharging current Id being twice as long as a duration of the charging current Ic. The currents shown in the FIG. 8 are shown schematically but for example the discharging current Id may more practically have descending slopes, like for example the arrangement current flowing through the first light emitting diode arrangement 21 (the waveform E in the FIG. 4).

For the FIG. 9-14, for a more practical (non-ideal) situation, by an amplitude of a current is meant an average value of this current during a time-interval that this current is unequal to zero, for an ideal situation both will be the same. By an average value of a current is meant an average value of this current during a sum of time-intervals that this current is firstly unequal to zero and then secondly equal to zero.

Figure 9:
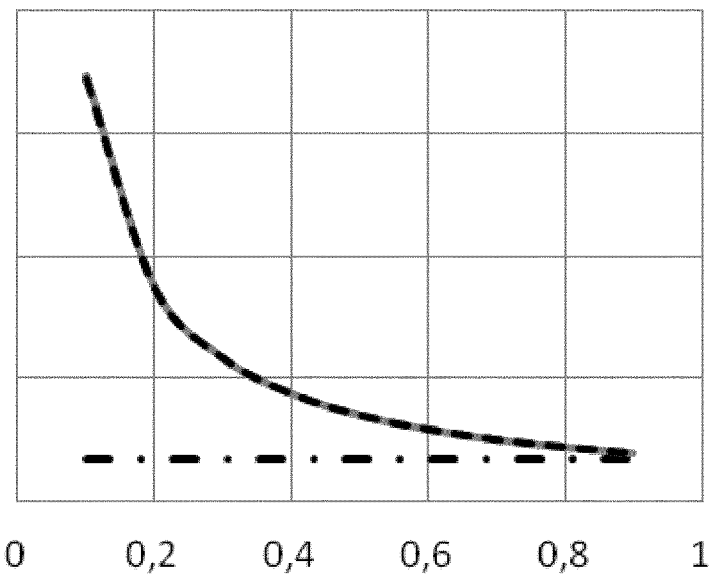
FIG. 9 shows an amplitude and an average value of an arrangement current flowing through a first light emitting diode arrangement as a function of a first duty cycle of a first switch with a second duty cycle of a second switch being fixed.

In the FIG. 9, an amplitude (curved line) and an average value (straight line) of an arrangement current flowing through a first light emitting diode arrangement 21 (vertical axis) as a function of a first duty cycle of a first switch 11 (horizontal axis) with a second duty cycle of a second switch 12 being fixed to 0.75 (75% of the time conducting and 25% of the time non-conducting) are shown. Clearly, for a fixed second duty cycle of the second switch 12, the average value (straight line) of the arrangement current flowing through the first light emitting diode arrangement 21 will have a constant value, where a value of the amplitude (curved line) of the arrangement current can be selected by selecting a value of the first duty cycle of the first switch 11.

Figure 10:
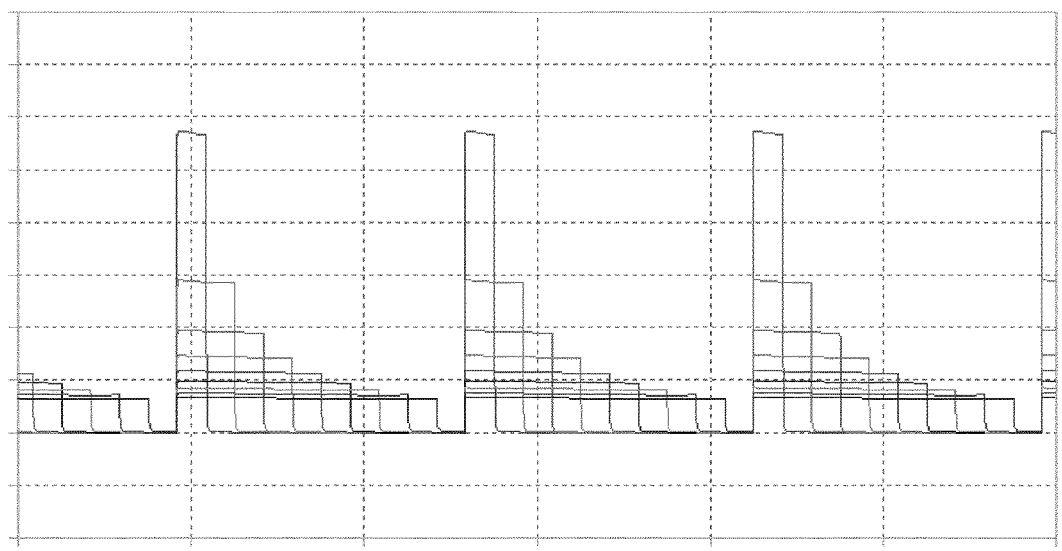
FIG. 10 shows an arrangement current flowing through a first light emitting diode arrangement as a function of time for different first duty cycles of a first switch with a second duty cycle of a second switch being fixed.

In the FIG. 10, an arrangement current flowing through a first light emitting diode arrangement 21 (vertical axis) as a function of time (horizontal axis) for different first duty cycles of a first switch 11 with a second duty cycle of a second switch 12 being fixed to 0.75 (75% of the time conducting and 25% of the time non-conducting) is shown. Values of the first duty cycles of the first switch 11 are stepwise increased from 0.10 (10% of the time conducting and 90% of the time non-conducting) to 0.90 (90% of the time conducting and 10% of the time non-conducting) with a step of 0.10. Clearly, for a smallest first duty cycle 0.10 (shortest conducting duration of the first switch 11) the arrangement current has a largest amplitude at a shortest duration, and for a largest first duty cycle 0.90 (longest conducting duration of the first switch 11) the arrangement current has a smallest amplitude at a longest duration.

Figure 11:
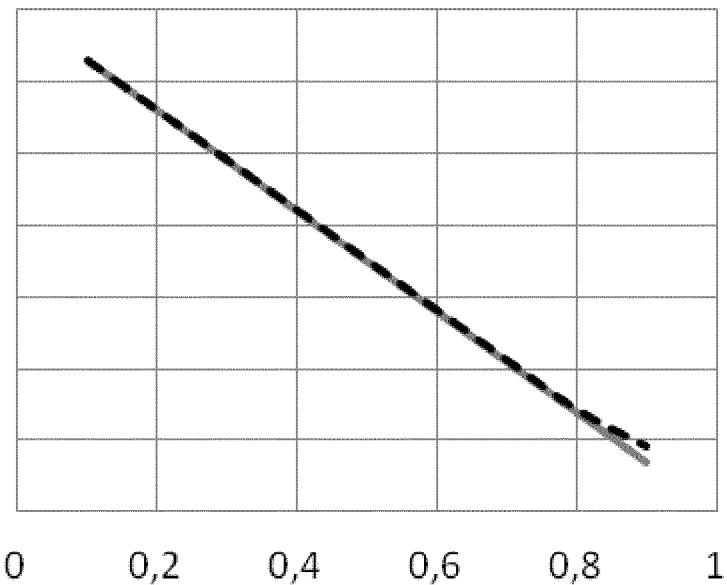
FIG. 11 shows an amplitude of an arrangement current flowing through a first light emitting diode arrangement as a function of a second duty cycle of a second switch with a first duty cycle of a first switch being fixed.

In the FIG. 11, an amplitude of an arrangement current flowing through a first light emitting diode arrangement 21 (vertical axis) as a function of a second duty cycle of a second switch 12 (horizontal axis) with a first duty cycle of a first switch 11 being fixed to 0.50 (50% of the time conducting and 50% of the time non-conducting) is shown. Clearly, for a fixed first duty cycle of the first switch 11, a value of the amplitude of the arrangement current can be selected by selecting a value of the second duty cycle of the second switch 12.

Figure 12:
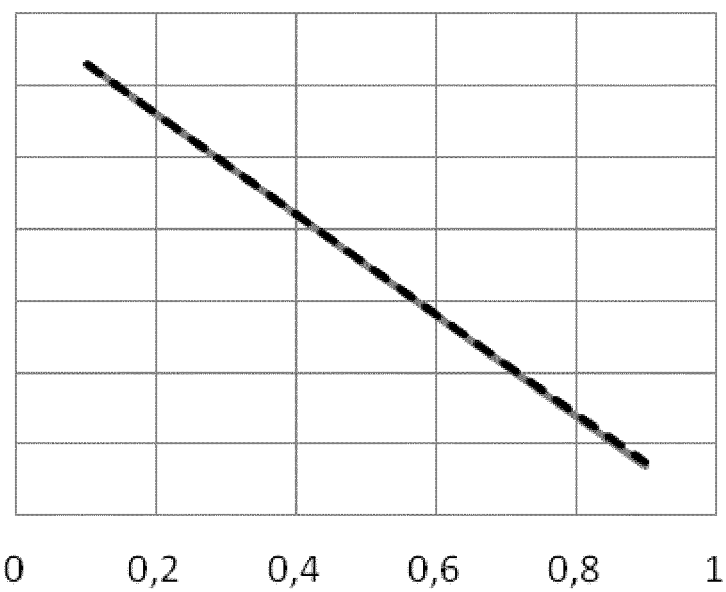
FIG. 12 shows an average value of an arrangement current flowing through a first light emitting diode arrangement as a function of a second duty cycle of a second switch with a first duty cycle of a first switch being fixed.

In the FIG. 12, an average value of an arrangement current flowing through a first light emitting diode arrangement 21 (vertical axis) as a function of a second duty cycle of a second switch 12 (horizontal axis) with a first duty cycle of a first switch 11 being fixed to 0.50 (50% of the time conducting and 50% of the time non-conducting) is shown. Clearly, for a fixed first duty cycle of the first switch 11, a value of the average value of the arrangement current can be selected by selecting a value of the second duty cycle of the second switch 12.

Figure 13:
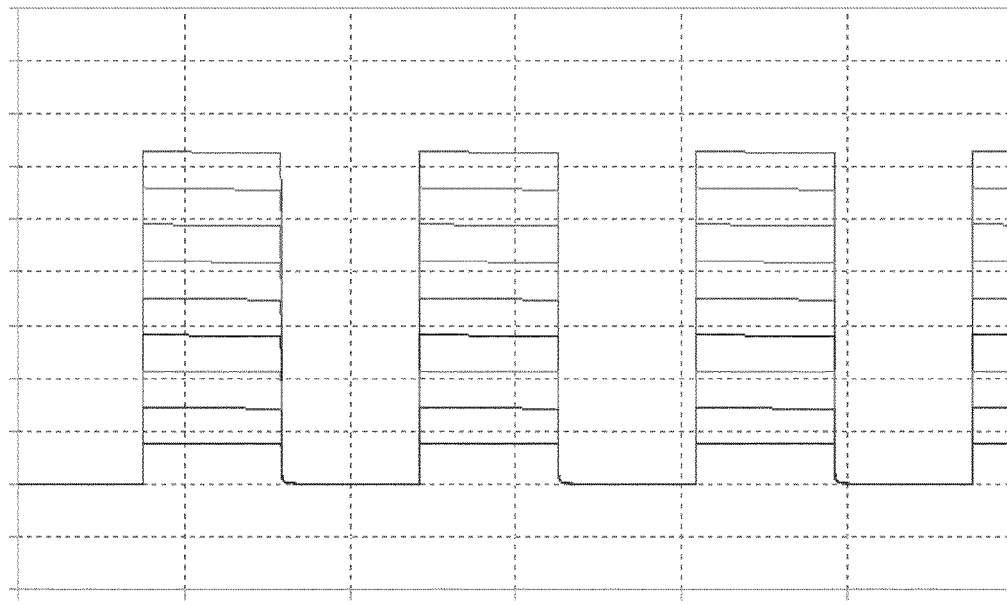
FIG. 13 shows an amplitude of an arrangement current flowing through a first light emitting diode arrangement as a function of time for different second duty cycles of a second switch with a first duty cycle of a first switch being fixed.

In the FIG. 13, an amplitude of an arrangement current flowing through a first light emitting diode arrangement 21 (vertical axis) as a function of time (horizontal axis) for different second duty cycles of a second switch 12 with a first duty cycle of a first switch 11 being fixed to 0.50 (50% of the time conducting and 50% of the time non-conducting) are shown. Values of the second duty cycles of the second switch 11 are stepwise increased from 0.10 (10% of the time conducting and 90% of the time non-conducting) to 0.90 (90% of the time conducting and 10% of the time non-conducting) with a step of 0.10, clearly for a smallest second duty cycle 0.10 (shortest conducting duration of the second switch 12) the arrangement current has a largest amplitude at a fixed duration, and for a largest second duty cycle 0.90 (longest conducting duration of the second switch 12) the arrangement current has a smallest amplitude at the fixed duration.

Figure 14:
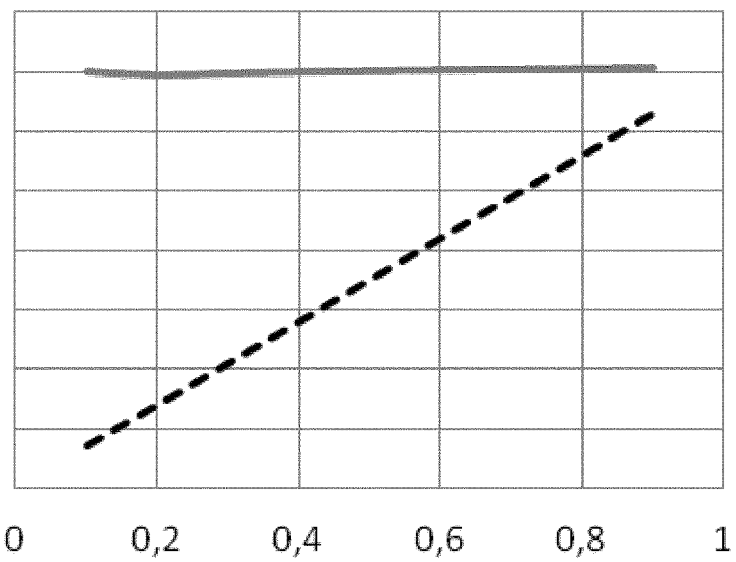
FIG. 14 shows an amplitude and an average value of an arrangement current flowing through a first light emitting diode arrangement as a function of a first duty cycle of a first switch with a second duty cycle of a second switch being derived from the first duty cycle.

In the FIG. 14, an amplitude (horizontal line) and an average value (rising line) of an arrangement current flowing through a first light emitting diode arrangement 21 (vertical axis) as a function of a first duty cycle of a first switch 11 (horizontal axis) with a second duty cycle of a second switch 12 being derived from the first duty cycle in accordance with a third circuit 3 as shown in the FIG. 3 are shown. Clearly, in this case, the amplitude (horizontal line) of the arrangement current has a fixed value of 0.35, where the average value (rising line) of the arrangement current can be selected by selecting a value of the first duty cycle of the first switch 11.

In a conducting mode of a switch, the switch will show a resistance of at most 100Ω, preferably at most 10Ω, more preferably at most 1Ω, most preferably at most 0.1Ω. In a non-conducting mode of a switch, the switch will show a resistance of at least 10 kΩ, preferably at least 100 kΩ, more preferably at least 1 MΩ, most preferably at least 10 MΩ. Other kinds of switches than sole transistors, such as relays and combinations of transistors are not to be excluded.

Preferably, the current source 6 will produce a supply current having a substantially constant average value, to get a good quality of the light. A supply current having a substantially constant average value is a current having an average value per period of a duty cycle of a switch, which average value fluctuates, from a first period to a second period, at most 20%, preferably at most 10%, more preferably at most 5%, most preferably at most 2%. In this case, within 1-2% accuracy from factory measurement/calibration, via a control of the duty cycles, a consistency in color control is achieved. Especially near white colors, the human eye is relatively sensitive to color variations. A momentary amplitude of the supply current from the current source 6 may fluctuate more (for example up to 30%) as long as the average value is substantially constant and within a specification limit. Such fluctuations may result from a presence of a high-frequency ripple, with a frequency of the ripple being larger than a frequency of a duty cycle of a switch, preferably at least twice as large, more preferably at least five times as large. A duration (a period) of a full duty cycle may for example be 0.10 msec. or 0.20 msec. without having excluded other values. Two or more of a first duty cycle of the first switch 11 and a second duty cycle of the second switch 12 and a third duty cycle of the third switch 13 etc. may have the same duration (conducting time+non-conducting time) and may then be synchronized or not, or they may have different durations. So, a use of duty cycles also comprises a use of a first (second, third) high signal having a first (second, third) flexible duration to bring the first (second, third) switch 11 (12, 13) into a conducting mode followed by a subsequent fourth (fifth, sixth) low signal having a fourth (fifth, sixth) fixed duration to bring the first (second, third) switch 11 (12, 13) into a subsequent non-conducting mode etc.

A parallel combination of first and second components does not exclude and may include a presence of a third component coupled in parallel to one or more of the first and second components or coupled serially to one or more of the first and second components. A serial combination of first and second components does not exclude and may include a presence of a third component coupled in parallel to one or more of the first and second components or coupled serially to one or more of the first and second components. Each circuit and each branch may comprise one or more further components in addition to the one(s) already listed.

So, more components may be present. For example, in parallel to a light emitting diode arrangement, a relatively small capacitance and/or an anti-parallel diode may be present for filtering purposes, in parallel to main contacts of a switch, a relatively small capacitance and/or an anti-parallel diode may be present for filtering purposes. For example, a relatively small resistance may be present in a serial combination with a component, and a relatively large resistance may be present in a parallel combination with a component.

The first and second circuits form a first section of the lighting circuit, and the fourth and fifth circuits form second and third sections of the lighting circuit. In a minimum situation, the first section will be present. In a more advanced situation, the first section and one or more of the second and third sections will be present. In each situation, a fourth section for example similar to the first section may be present in addition and is not to be excluded. The third circuit may alternatively be realized through a processor. The first to fourth control signals may be generated fully independently from each other or may show one or more dependencies. Usually, each control signal will show one out of two values, but more than two values may be introduced for more advanced controls. In the description of the drawings, the logical values high and low have been used, but other and/or more values may be introduced as well.

Two components can be coupled directly without a third component being in between and can be coupled indirectly via a third component.

Summarizing, a lighting circuit comprises a first circuit 1 with an element 31 with a diode function coupled serially to a parallel combination of a capacitor 41 and a serial combination of a first LED 21 and a first switch 11 and comprises a second circuit 2 with a second switch 12. The circuits 1, 2 are parallel circuits. The lighting circuit produces light in response to a supply current from a current source 6. The second switch 12, when conducting, lets the supply current pass and prevents it from flowing through the element 31, and when non-conducting, blocks the supply current and it flows through the element 31. The first switch 11, when non-conducting, prevents the first LED 21 from producing some of the light, and, when conducting, allows the first LED 21 to produce some of the light. Power for the first LED 21 is delivered via the supply current when flowing through the element 31 or via a capacitor current supplied by the capacitor 41.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting circuit for producing light, the lighting circuit comprising:
    a first circuit comprising an element with a diode function, a capacitor, a first light emitting diode arrangement and a first switch, the element with the diode function being coupled serially to parallel branches, a first branch of the parallel branches comprising the capacitor, and a second branch of the parallel branches comprising the first light emitting diode arrangement and the first switch coupled serially to each other;
    a second circuit comprising a second switch, the second switch being coupled in parallel to the first circuit; and
wherein the lighting circuit further comprises a fourth circuit,
    wherein the fourth circuit comprises a second light emitting diode arrangement and a third switch,
    wherein the second light emitting diode arrangement and the third switch are coupled in parallel, and
    wherein the second and the fourth circuit are coupled in series.

2. The lighting circuit as defined in claim 1, the lighting circuit producing the light in response to a supply current from a current source, the second switch being parallel to the element with a diode function, the element with the diode function having a diode forward direction such that in a conducting mode of the second switch, the supply current is prevented flowing through the element with the diode function, and in a non-conducting mode of the second switch, the supply current is forced to flow through the element with the diode function.

3. The lighting circuit as defined in claim 2, the first switch being configured to, in a non-conducting mode of the first switch, preventing the first light emitting diode arrangement from producing at least a first part of the light, and the first switch being configured to, in a conducting mode of the first switch, allowing the first light emitting diode arrangement to produce at least the first part of the light, power for the first light emitting diode arrangement being delivered via the supply current when flowing through the element with the diode function or being delivered via a capacitor current supplied by the capacitor.

4. The lighting circuit as defined in claim 1, further comprising:
    a third circuit for generating a first control signal for controlling the first switch and for generating a second control signal for controlling the second switch, the first control signal having respective first and second values for bringing the first switch into the respective conducting and non-conducting modes, and the second control signal having respective third and fourth values for bringing the second switch into the respective conducting and non-conducting modes.

5. The lighting circuit as defined in claim 1, the lighting circuit producing the light in response to a supply current from a current source, the third switch being configured to, in a conducting mode of the third switch, letting the supply current pass, thereby preventing the supply current from flowing through the second light emitting diode arrangement, and the third switch being configured to, in a non-conducting mode of the third switch, letting the supply current not pass, whereby the supply current is forced to flow through the second light emitting diode arrangement for producing at least a second part of the light.

6. The lighting circuit as defined in claim 4, wherein the third circuit is configured to generate a third control signal for controlling the third switch, the third control signal having respective fifth and sixth values for bringing the third switch into the respective conducting and non-conducting modes.

7. The lighting circuit as defined in claim 1, further comprising a fifth circuit:
    wherein the fifth circuit comprises a third light emitting diode arrangement and a fourth switch
    wherein the third light emitting diode arrangement and the fourth switch are coupled in parallel, and
    wherein the fourth and the fifth circuit are coupled in series.

8. The lighting circuit as defined in claim 7, the lighting circuit producing the light in response to a supply current from a current source, the fourth switch being configured to, in a conducting mode of the fourth switch, letting the supply current pass, thereby preventing the supply current from flowing through the third light emitting diode arrangement, and the fourth switch being configured to, in a non-conducting mode of the fourth switch, letting the supply current not pass, whereby the supply current is forced to flow through the third light emitting diode arrangement for producing at least a third part of the light.

9. The lighting circuit as defined in claim 4, further comprising: wherein the third circuit is configured to generate a fourth control signal for controlling the fourth switch, the fourth control signal having respective seventh and eighth values for bringing the fourth switch into the respective conducting and non-conducting modes.

10. The lighting circuit as defined in claim 1, the first switch comprising a first transistor, the second switch comprising a second transistor, and the element with the diode function comprising a diode or a zener diode or a part of a third transistor or a fourth transistor.

11. The lighting circuit as defined in claim 1, the third switch comprising a fifth transistor.

12. The lighting circuit as defined in claim 7, the fourth switch comprising a sixth transistor.

13. The lighting circuit as defined in claim 1, a value of a first duty cycle of the first switch defining an amplitude of an arrangement current flowing through the first light emitting diode arrangement for a given value of a second duty cycle of the second switch, and a value of the second duty cycle of the second switch defining an average value of the arrangement current.

14. A device comprising the lighting circuit as defined in claim 1 and further comprising a current source for producing a supply current.

* * * * *